Patented Feb. 27, 1923.

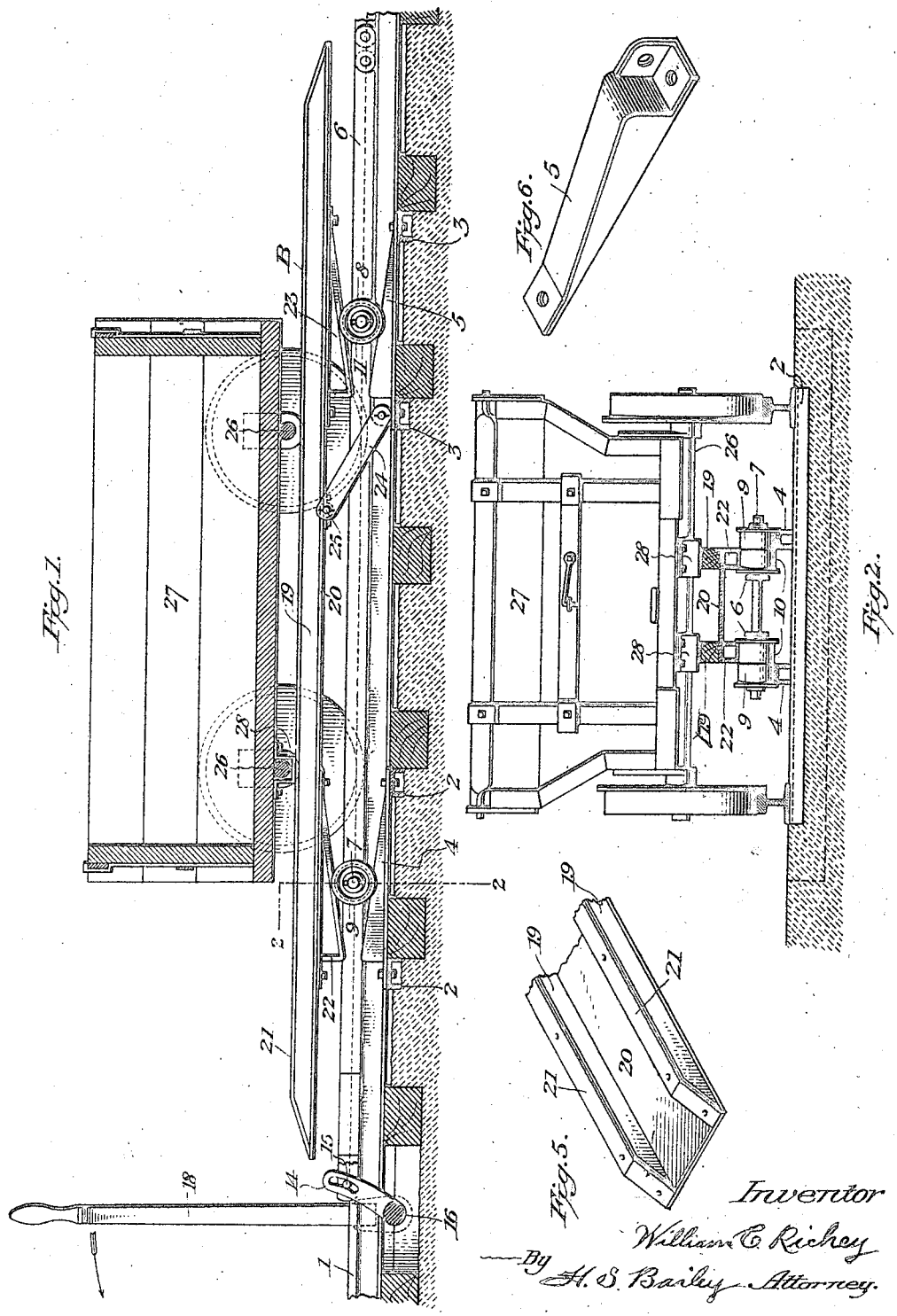

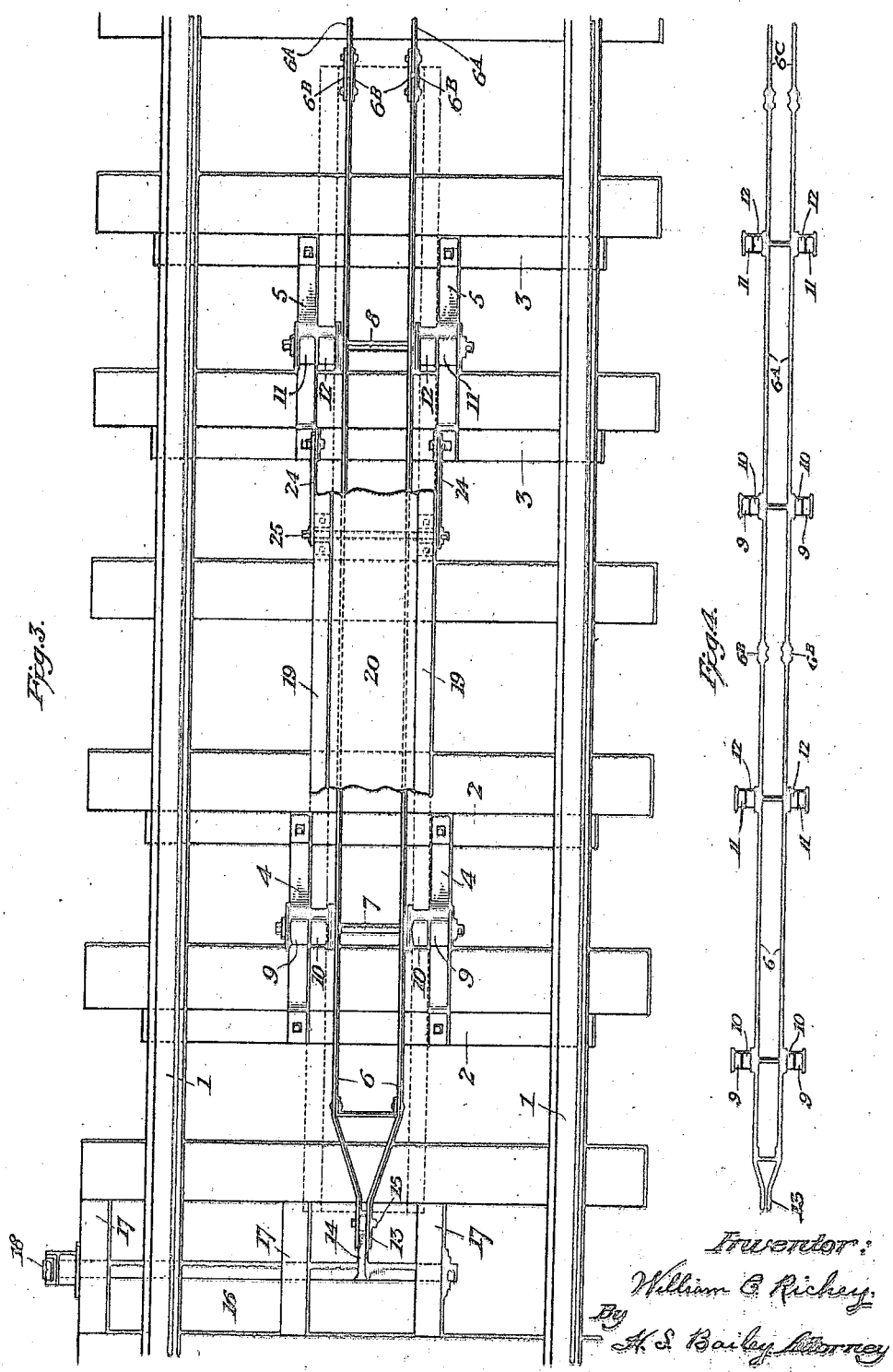

1,446,584

UNITED STATES PATENT OFFICE.

WILLIAM C. RICHEY, OF DENVER, COLORADO.

CAR-RETARDING BRAKE MECHANISM FOR COAL OR ORE CAR TIPPLES.

Application filed November 21, 1921. Serial No. 516,816.

*To all whom it may concern:*

Be it known that I, WILLIAM C. RICHEY, a citizen of the United States of America, residing at the city and county of Denver and State of Colorado, have invented a new and useful Car-Retarding Brake Mechanism for Coal or Ore Car Tipples, of which the following is a specification.

My invention relates to a car retarding brake mechanism for coal or ore cars for tipples.

And the objects of my invention are:

First: to provide a brake mechanism which is adapted to be located at any desired point in an inclined track, and which can be operated to gradually retard the progress of an approaching coal or ore car, and bring the same to a full stop.

Further, to provide a longitudinal brake member which is supported midway between the rails of a track, and means for gradually raising said brake member to engage brake shoes on the under side of a car passing over said brake member, whereby the said car is gradually retarded and then brought to a full stop by the increased frictional contact between said brake member and said brake shoes.

Second: to provide a longitudinal brake member located between the rails of a track, oppositely inclined cam elements on said brake member and the track bed, rollers interposed between said cam elements, and means for gradually forcing said rollers forward between said cam elements, whereby said brake member is raised to engage shoes on the under side of a car passing over said brake member, thereby to gradually retard and finally stop the said car.

These objects are accomplished by the mechanism illustrated in the accompanying drawings, in which:

Figure 1 is a longitudinal sectional view, showing the improved brake mechanism supported between the tracks of a railway, and an ordinary coal car in the act of passing over said mechanism, and provided with brake shoes in engagement with the brake member of the said mechanism.

Fig. 2, is a transverse sectional view on the line 2—2 of Fig. 1.

Fig. 3, is a plan view of the rail bed, showing the brake mechanism, a portion only of the longitudinal brake member being shown.

Fig. 4, is a plan view, on a reduced scale, of the connected, lever-operated parallel bars, and rollers supported thereby, for raising the brake member.

Fig. 5, is a perspective view of a portion of the brake member.

Fig. 6, is a perspective view of one of the cams or inclines, which act in conjunction with the rollers for effecting the raising of the brake member.

Referring to the accompanying drawings:

The numeral 1, indicates the tracks or rails of a railway over which cars of coal or ore pass from the mine to a discharging terminal. These cars are the well-known type of dumping cars used for such purposes, and are gravity-operated. They are not provided with brakes, and as a result, a loaded car gains a considerable momentum in transit, even on a road of slight grade, and a common method of slowing up, and finally stopping these cars, is by thrusting poles or "sprags" in between the spokes of the wheels. This is done by attendants, as the cars pass, and is not only a very troublesome and unsatisfactory way of accomplishing the result, but after the car wheels are chocked, the car will frequently slide a considerable distance, thereby wearing flat surfaces on the wheels. The present invention is designed to eliminate these objectionable expedients, by providing a braking mechanism by which cars may be gradually and easily brought to a stop, and without injury to the same, or danger to the attendant. The braking mechanism is made up of connected units which are located midway between the two tracks. Each unit is preferably about ten feet in length, and as many units may be employed as conditions may require. roadways of steep grade, requiring more units at the stopping terminal than those of only slight inclination. As all the units are similar, the description of a single unit will suffice. The rails 1, are connected at a given point by a pair of parallel channel bars 2, which are arranged approximately eighteen inches apart, and a similar pair of channel bars 3, also connect the rails at a distance of about five feet from the first pair. To the channels 2, are bolted a pair of spaced cams in the form of inclined tracks 4, which are parallel with the rails, and have a rise or inclination of about four inches in the space between the two channel bars 2, the upward inclination of the said cams or tracks 4, being in the opposite direction to that of the rails 1. A pair of similar inclined cams or tracks 5, are bolted to the channel bars 3, and these cam tracks are in line with the cam tracks 4, and incline in the same direction. A pair of spaced bars 6, extend between the cam tracks 4 and 5, and beyond them at each end, the length of said bars being about ten feet. Shafts 7 and 8 are mounted in these bars, and extend beyond them on each side, and on the end portions of the shaft 7, are loosely mounted rollers 9, which are positioned to rest upon and roll upon the cam tracks 4, and these rollers are flanged on their outer ends as shown. Rollers 10 are also loosely mounted on the shaft 7, adjoining the rollers 9, and the inner ends of the rollers 10, are flanged and lie next the bars 6. The shaft 8, also carries loosely mounted rollers 11, flanged on their outer ends, and adapted to rest upon and to ride upon the cam tracks 5, and adjoining these rollers, are loosely mounted rollers 12, which are flanged on their inner ends.

The forward end portions of the bars 6, are bent inward toward each other, so as to lie parallel and close together, as shown at 13, and between the ends 13, extends a lever arm 14, which is pivotally connected to the ends 13, by a bolt 15. The lever arm 14, projects from a shaft 16, which lies beneath the rails 1, and is mounted in suitable bearings 17, which lie between and are secured to the adjacent cross ties. One end of the shaft 16, extends beyond the adjacent rail, and is provided with a vertically disposed hand lever 18, and by swinging this hand lever in the direction of the arrow shown in Figure 1, the bars 6, are drawn forward, and the rollers 9 and 11, ride the inclined tracks 4 and 5, respectively, for a purpose to be hereinafter fully explained.

The rear ends of the roller-supporting bars 6, are adapted to be pivotally connected to similar bars 6^A, by links 6^B, and the rear end of the bars 6^A, are similarly connected to bars 6^C, and so on for as many pairs of bars as the road conditions may require. Each additional pair of bars is provided with shafts having rollers thereon, the same as described in connection with the bars 6, and the link connection between the adjoining ends of the several pairs of bars permits them to conform to variations in the general inclination of the rail bed, and enables them also to be operated by a single shaft 16, and a hand lever 18, as will be clearly understood by reference to Figures 3 and 4.

The brake member B, of the improved mechanism, is supported upon the inner rollers 10 and 12, and is arranged and constructed in the following manner:

This brake B, comprises parallel bars 19, of about the same length as the roller-supporting bars 6 and spaced a distance equal to the distance between the rollers 10, or the rollers 12, their ends being beveled or inclined, as shown. The bars 19, are connected by a sheet iron plate 20, which is secured to the under sides of the said bars, and their upper sides are faced with metal strips 21. To the under side of the brake B, are secured pairs of cam tracks 22 and 23, similar in outline to the cam tracks 4 and 5, but they are resilient, and yield under pressure, while the tracks 4 and 5, are solid and unyielding. The cam tracks 22, rest on the rollers 10, and the cam tracks 23, rest on the rollers 12, and the tracks 22 and 23, are oppositely inclined with respect to the tracks 4 and 5. Arms 24, are pivotally connected at their upper ends to a rod 25, which is secured to the under side of the brake, and the opposite ends of these arms are pivotally connected to end portions of the cam tracks 5. The arms 24, permit an up and down movement of the brake B, but prevent the same from sliding forward on its supporting rollers 10 and 12.

The brake B, lies on a horizontal plane and at a height above the rails 1, slightly less than the height of the axles 26, of the bars 27, which pass over the said brake, so that when the brake is in its normal horizontal position, the axles of a car passing over it will clear the brake. A pair of brake shoes 28, which are U-shaped, in end view, are placed over the forward axle 26, of each car and bolted to the bottom of the said car. These brake shoes are spaced to be engaged by the bars 19, of the brake B, when the same is applied to slow up and stop a car, as will now appear. The rail bed above a terminal is provided with two or more brake units, as the character of the grade may require, and as an approaching car reaches the point where the brake units begin, an attendant swings the lever 18, in the direction of the arrow, and the bars 6, are thereby moved forward, carrying with them the rollers 9, 10, 11 and 12. The rollers 9 and 11, ride upon the cam tracks 4 and 5 respectively, and the rollers 10 and 12, are thereby forced forward under the cam tracks 22 and 23, respectively, which are secured to the bottom of the brake B, and the brake is thereby raised and forced into frictional engagement with the brake shoes 28, on the under side of the car. The brake is applied with an increasing pressure, and as the car moves forward, the frictional resistance offered by the brake, gradually slows the car down until it comes to a stop. The cam tracks 22 and 23, turn the rollers 10 and 12, in one direction, and the cam tracks 4 and 5, turn the rollers 9 and 11 in the opposite direction to the rollers 10 and 12; hence, the necessity for two sets of loosely mounted rollers on each shaft.

When the lever 18 is swung back to its normal or non-braking position, the backward and downward movement of the rollers permits the brake B, to drop down by gravity out of engagement with the brake shoes 28, on the car, and the said rollers, in conjunction with the arms 24, support the brake in this position during the interval between the arrival of the cars at the terminal.

Having described my invention, what I claim as new and desire to secure by Letters Patent, is:

1. The combination with a section of railway tracks and cars on said tracks having brake shoes on their bottom sides; of a longitudinal brake between said tracks, inclined members on the under side of said brake, roller supports beneath said inclined members, means for moving said roller supports forward beneath said inclined members, whereby said brake is raised into frictional engagement with the brake shoes of a car passing over said brake, and means for preventing endwise sliding movement of said brake.

2. The combination with a section of railway tracks and cars on said tracks having brake shoes on their bottom sides; of a longitudinal brake between said tracks having resilient inclined cams on its under side, oppositely inclined cams on the track bed, shafts and rollers thereon for engaging said oppositely inclined cams, means for moving said shafts forward, whereby said rollers act to lift said brake into frictional engagement with the brake shoes on a car passing over said brake, and means for preventing endwise sliding movement of said brake.

3. The combination with a section of railway tracks and cars on said tracks having brake shoes on their bottom sides; of cross bars connecting said tracks, inclined cams secured to said cross bars, parallel longitudinal bars extending between said cams and shafts supported in said longitudinal bars, pairs of loosely mounted rollers on said shafts, which rest on said inclined cams, a longitudinal brake having inclined cams on its under side oppositely pitched from the first mentioned cams, and other pairs of rollers on said shafts upon which said latter cams rest, and means for moving said bars forward, whereby the rollers are caused to raise the brake into frictional engagement with the brake shoes on a car passing over said brake, and means for preventing endwise sliding movement of said brake.

4. The combination with a section of railway tracks and cars on said tracks having brake shoes on their bottom sides; of cross bars connecting said tracks, inclined cam tracks secured to said cross bars, parallel longitudinal bars between said cam tracks, and shafts supported therein, pairs of rollers on said shafts which rest on said cam tracks, a shaft, a lever arm thereon connected to said parallel bars, and a hand lever for turning said shaft, whereby the bars are drawn upon and the rollers ride up said inclined cam tracks; a longitudinal brake comprising connected parallel bars, cam tracks on the under side of said brake which are oppositely pitched from the first mentioned cam tracks, other rollers on said shafts on which said latter cam tracks rest, the upward movement of the first mentioned rollers on the first mentioned cam tracks, and of the last mentioned rollers beneath the last mentioned cam tracks acting to raise said brake into frictional engagement with the brake shoes on a car passing over said brake, and arms pivotally connected to said brake, and to a fixed object on the rail bed, for preventing endwise sliding movement of the brake.

5. In mechanism of the character described, a brake comprising parallel bars, a metal plate connecting said bars, said bars having inclined or beveled ends and pairs of resilient inclined cam tracks on the under side of said brake near the ends thereof.

6. In mechanism of the character described, a brake comprising parallel wooden bars having beveled ends, said bars being faced with metal strips, a metal plate connecting said bars, and pairs of resilient inclined cam tracks on the under side of said brake.

7. The combination with railway tracks, cross bars connecting the same, and inclined cam tracks secured to said cross bars, of a longitudinal brake above said cam tracks having inclined cam tracks on its under side oppositely pitched from the first mentioned cam tracks, the former and latter cam tracks forming a wedge shaped space between them, means interposed in said wedge shaped space, and means for moving said interposed means forward, whereby the said brake is raised, and cars on said railway tracks having brake shoes on their bottom sides which are adapted to be engaged frictionally by said brake, as said cars pass over said brake.

8. The combination with railway tracks, stationary inclined cams between said railway tracks and cars on said railway tracks having brake shoes secured to their bottom sides; of parallel bars extending between said inclined cams, and shafts supported therein, a pair of independent rollers loosely mounted on the outer portion of each shaft, the outer rollers of each pair resting on said inclined cam tracks; a longitudinal brake having inclined cam tracks on its under side which rest on the inside rollers of each pair of rollers, said latter cam tracks being oppositely pitched with respect to the former cam tracks, a lever mechanism for drawing the roller supporting bars forward, whereby the outer rollers of each pair of rollers ride up on the first mentioned cam tracks, and the inner rollers move forward under the cam tracks on the brake, thereby lifting the said brake into frictional engagement with the brake shoes on the under side of a car passing over said brake, and pivoted arms connected to said brake and to a fixed object on the rail bed for preventing endwise sliding movement of the brake.

In testimony whereof I affix my signature in presence of two witnesses.

WILLIAM C. RICHEY.

Witnesses:
G. SARGENT ELLIOTT,
ELIZABETH SMITH.